Nov. 19, 1968     L. O. PATERSON     3,412,021
WATER-TREATING METHOD AND AGGLOMERATES OF N-HALOGENATED
ORGANIC COMPOUNDS FOR USE THEREIN
Filed Sept. 15, 1964

FIG. 1

FIG. 2

United States Patent Office 3,412,021
Patented Nov. 19, 1968

3,412,021
WATER-TREATING METHOD AND AGGLOMERATES OF N-HALOGENATED ORGANIC COMPOUNDS FOR USE THEREIN
Laurene O. Paterson, 1219 E. Church St., Adrian, Mich. 49221
Continuation-in-part of application Ser. No. 6,052, Feb. 1, 1960. This application Sept. 15, 1964, Ser. No. 405,320
20 Claims. (Cl. 210—62)

This invention is a continuation-in-part of my copending application Ser. No. 6,052, filed Feb. 1, 1960 now abandoned, and pertains to a method of treating and disinfecting water. More particularly, it concerns a system wherein water flows over solid preformed agglomerates containing N-halogenated compounds capable of maintaining in said water controlled amounts of active bromine, or mixtures of active bromine and active chlorine, and improved agglomerates for use therein.

The halogens chlorine and bromine have long been used for water treatment, since they have a broad spectrum of bactericidal activity at low concentration. Of the two, chlorine has much wider application, being supplied as a pure gas in pressurized cylinders, or alternatively as a liquid or solid hypochlorite containing 5 to 70% available chlorine. Dosage of these concentrated forms of chlorine is so small that finely calibrated metering devices are required for field use. Furthermore, chlorine residuals in water must be maintained within close tolerance, since concentrations only slightly higher than the effective minimum are unpalatable and irritating. For instance, in the disinfection of drinking water, concentrations of chlorine in excess of about 3 mgm. per liter are objectionable from a taste standpoint, yet concentrations of at least .5 mgm. per liter must prevail to assure bacterial kill. To add chlorine in such micro amounts and maintain free chlorine residuals within such narrow range requires careful metering of the additive and involves the precise performance of the sensitive gas injectors or liquid metering pumps. Since these mechanical devices are continuously exposed to the highly corrosive chemical, malfunction is common. Dangerously high concentrations of chlorine in the water may result, or, conversely, chlorine residuals become so low as to be ineffective bactericidally.

Another variable which makes difficult the maintaining of satisfactory chlorine residuals with conventional metering equipment is the varying chlorine demand of water, particularly as exemplified by the continuously changing requirements for this chemical in swimming pool water disinfection. To properly compensate for such variable chlorine requirement involves manual resetting of the metering device constantly, which for practical reasons is not done. Chlorine residuals may fluctuate widely, often resulting in a pool dangerously deficient in chlorine during heaviest use. Attempts have been made to correct for this shortcoming by providing chlorine sensors in the treated water with feed-back controls to the chlorine feeder to continuously readjust the pumping rate. However, such systems are expensive and introduce an additional area of possible malfunction.

Bromine, although an excellent water disinfectant, has very limited use in the present art. Liquid bromine gives a severe burn if allowed to contact the skin; its fuming vapors are highly corrosive and toxic. Inorganic hypobromites have not been successfully offered in commerce. They are extremely unstable, reverting in a short time to the germicidally inactive bromate.

In the process of this invention, the problems associated in the past with the accurate dosage of chlorine and bromine to meet fluctuating water demand have been largely alleviated. Halogen is herein provided in the form of solid agglomerates having dissolution characteristics to supply active halogen responsive to the demand of the water. Other water-treating additives may be incorporated in such agglomerate, being continuously released to the water as the agglomerate dissolves. Any requirement for the delicate mechanical metering devices of the prior art has been completely eliminated.

Recently the N-chlorinated and N-brominated organic compounds have become available and found limited application in water treatment. In U.S. Patent 2,184,888, Muskat et al. describe the N-halogenated derivatives of the amides and imides of cyanuric acid; in U.S. Patent 2,430,233, Magill discusses the N-chlorinated hydantoins and their properties. Certain organo-N-brominated compounds are discussed by Marks et al. in U.S. Patent 2,580,808 and claimed to be good disinfectants in the presence of excess ammonia. U.S. Patents 2,779,764 and 2,868,787 disclose the preparation of a series of N-halogenated compounds containing both active chlorine and active bromine.

Generally these N-halogenated compounds, when used as disinfecting agents, offer the advantage that they are solids which are safe-to-handle and may contain high percentages of bromine as well as chlorine. Their use affords the further advantage of being able to maintain good halogen residuals in water. This property is ascribed to the simultaneous introduction into the water of the organic amido or imido compound which tends to bind with and retain the active halogen atoms. As described in my co-pending application Ser. No. 126,403, now U.S. Patent 3,147,219, the simultaneous addition to water of both active bromine and chlorine in the form of mixed N-halogenated compounds affords a particularly active germicidal system.

However, in spite of their many inherently good properties, the N-halogenated organic compounds have found very limited application in the field of water treatment, since they appeared to have little merit in the established processes. Many of these compounds, as for example, the N-halogenated melamines of Muskat et al., have very low solubility in water and do not lend themselves to the preparation of the concentrated aqueous solutions which are metered by the conventional displacement pumps. N-halogenated compounds of greater solubility, such as the N-chloro-cyanurates, decompose in storage in concentrated aqueous solution, evolving noxious nitrogen trichloride. Use of the N-halogenated compounds as water disinfectants has been largely confined to their addition in single dosage as quickly-soluble powders or tablets to provide ultimate desired concentration of active halogen in the water.

It has now been found that the N-halogenated organic compounds do have application in a wet process to continuously and controllably add halogen to water. The N-halogenated compound is provided in the form of a cohesive solid mass, or agglomerate, which agglomerate is a particular feature of the invention. In the first place, the N-halogenated compounds having low solubility, when agglomerated, have unexpectedly good stability in water so that they can be immersed for long periods of time without substantial loss of potency. Secondly, agglomeration, by restricting dissolution to the outer surface of the aggregate, allows the water to act upon a sufficiently large mass of the N-halogenated organic compound to permit a sustained water treatment, yet reduce exposure of the N-halogenated compound to the water to make a controlled addition of active halogen possible.

Most important, my agglomerates are distinguished by the fact that they contain compounds of a type wherein the active halogen has a high degree of reactivity with the impurities and contaminants it is intended to destroy.

They provide, in fact, a chemical sensor capable of an autonomic response. Because of this the dissolution rate of agglomerates in water to impart active halogen and other additives contained therein increases in response to the contamination load in the water. The controlled dissolution characteristics of my agglomerates and their sensitivity to the halogen demand of the water in intimate contact with such agglomerate makes possible a system of effective water treatment requiring a minimum of manual controls.

In an important aspect, agglomerates of this invention are continuously exposed to and bathed by impure water be restricted to predetermined low values, preventing any possibility of overdosage.

Table I lists a few typical N-halogenated organic compounds, their solubilities in water, their active halogen content and the percent of active halogen imparted in water at saturation. Sometimes combinations of these compounds are used for greater flexibility in providing desired properties to the agglomerates. Since the N-halogenated compounds have the common property of autonomic response to supply more or less halogen as the demand of the water varies, broad discretion is permitted in the compound selected.

TABLE I

| N-halogenated Organic Compound | Solubility in Water, percent | Active Halogen Contained in Compound, percent | Active Halogen Imparted to Water at Saturation,* mgm./liter |
|---|---|---|---|
| Phthalimide | 0.036 | | |
| N-chloro | 0.018 | 19.5 | 35 |
| N-bromo | 0.001 | 35.0 | 4 |
| p-Toluene sulfonamide | 0.316 | | |
| N-dichloro | 0.0005 | 29.6 | 1.5 |
| N-bromo-N-chloro | 0.0044 | 40.6 | 1.8 |
| Azodicarbonamidine hydrochloride | | | |
| 2,5-N,N¹-dichloro | 0.08 | 32.4 | 260 |
| Dimethylhydantoin | 13.5 | | |
| N,N¹-dichloro | 0.17 | 36.0 | 610 |
| N-bromo-N¹-chloro | 0.13 | 47.9 | 610 |
| N,N¹-dibromo | 0.102 | 55.8 | 570 |
| Diphenylhydantoin | (**) | | |
| N-bromo-N-chloro | 0.00045 | 29.9 | 1.2 |
| Dimethylglycoluril | 0.022 | | |
| N,N,N,N-tetrachloro | 0.04 | 46.0 | 180 |
| N-bromo-N,N-dichloro | 0.039 | 47.4 | 185 |
| N,N¹-dibromo | 0.008 | 48.5 | 37 |
| Glycoluril | 0.15 | | |
| N,N,N,N-tetrachloro | 0.01 | 50.7 | 50 |
| N,N-dichloro | 0.27 | 33.6 | 810 |
| Sodium cyanurate | 1.0 | | |
| N-bromo-N-chloro | 0.83 | 43.7 | 3,600 |
| Triethylene diamine | 38.0 | | |
| Dibromo-dihydrochloride | 0.001 | 37.0 | 4 |
| Bromo-chloro-dihydrochloride | 0.002 | 38.8 | 8 |
| Melamine | 0.3 | | |
| N,N,N-trichloro | 0.0022 | 46.5 | 10 |

*Determined by Iodine-thiosulfate method.
**Insoluble.
NOTE.—Temperautre, 20° C.

pumped directly from a contaminated source whereby desired halogen residuals are maintained in said water.

In another aspect of the invention agglomerates containing N-halogenated compounds and having select dissolution characteristics are disposed as a bed for dispensing contact with the flowing water. A reservoir is provided for the maintaining of a replenishing supply of the agglomerates so that the surface area of the agglomerates exposed to the impure water is held substantially constant.

In a further aspect, novel agglomerates are provided which are designed for a more complete treatment of the raw or contaminated water. These may contain, in addition to the N-halogenated organic compound, flocculants, filter assists, and ion exchange materials.

The above and other aspects of the invention will become more apparent from the reading of the following detailed discussion when read in the light of the accompanying drawings and appended claims.

The N-halogenated compounds suitable for use in my agglomerates are solids and are characterized as containing at least one N-bromine radical in which structure the bromine atom is loosely bound to the nitrogen atom and released in water as "active bromine." The present process uses to advantage the low solubility of the N-halogenated organic compounds as part of the control system to regulate halogen input to the water. Compounds finding useful application therein have solubility within the range of from .0001 to 1%. Such low solubility requirements for the N-halogenated compounds assures that the active halogen reserve remains in the solid agglomerate form. The limited solubility of the N-halogenated component also assures that maximum concentrations of the active halogen in the water being treated can Agglomerates of a type suitable for my purpose are formed by adhering particles such as crystals or powders of the N-halogenated organic compound with or without other additives into larger bodies in a manner which will impart the physical and dissolution rate charatceristics desired. They take many shapes and sizes, it being required, however, that they maintain a porous treating bed through which the water can freely pass. Agglomeration is carried out by compression of particles into a compacted mass, as by tableting or briquetting. Agglomerates are also manufactured by the wet-forming of the N-halogenated compound, such as molding or extrusion.

In some instances, the addition of 1 to 5% of certain binders serves one of several functions in the manufacture of such agglomerates. Such binders may be organic or inorganic. They are restricted in nature only by the property that they must act to cement the particles of the agglomerate together, and, at the same time, not be subject to attack or destruction by the N-halogenated compound in question.

One class of compounds which shows merit are the organic polymers of a resinous or elastomeric type which are resistant to halogen attack. Such polymers of necessity have low water solubility, or are capable of being converted to a substantially water-insoluble form during compounding. They are added to the N-halogenated compound as a solution in a non-reactive solvent such as carbon tetrachloride, or as an aqueous emulsion. It can be realized that the number of polymeric materials represented by the class of compounds as above defined is very large and that new products are being continuously devised. Examples of such suitable binders are selected from the broad classes of polymers as represented by the natural and synthetic rubbers, the polyisobutylenes, the polybutenes, the polystyrenes, the polyesters, the polyvinyl chlorides, the polyamides, the polyurethanes, and the cellulose esters and ethers. Many suitable adhesive binders are also derived by the copolymerization of monomers. For instance, vinylidene-chloride-acrylonitrile copolymer in aqueous emulsion form serves as an excellent binder. Certain members of the more fully-reacted, halogen-resistant phenolics and aminoplasts are also useful for the purpose. The binder itself often reduces dissolution rates.

In the dynamic system of water treatment herein described, the treated water often does not become saturated with respect to the N-halogenated compound. Then the dissolution rate of the agglomerates to provide active halogen to the water is an important feature. The dissolution rate of a particular agglomerate is usually dependent on three factors which may be altered in the agglomeration process. These are (a) surface area/weight ratio, (b) hardness of the agglomerate, (c) specific formulation characteristics of the agglomeration premix. By altering these three dissolution-rate-determining factors, useful variations are made in the rate at which the various agglomerates dissolve the water to provide active halogen. Agglomerates finding application have dissolution rates to provide from about 1 mgm. up to about 3000 mgm. of active halogen per minute per pound of agglomerated material in flowing water exposure. The term dissolution rate, unless otherwise defined, refers to rates as determined in distilled water and represent arbitrarily selected values. Such rates may radically increase under contamination load. The dissolution rate may even decrease in waters already substantially saturated with the N-halogenated compound being used.

Agglomeration will in all instances reduce the surface area/weight ratio and thus, for a given amount of an N-halogenated organic compound, will reduce the dissolution rate of the agglomerated material over that encountered with the comparatively small particles of a powdered material. The agglomerates have various degrees of hardness to alter their dissolution rates. It is essential only that they have sufficient hardness to retain their shape during the dissolution process until substantially completely consumed. Finally, the dissolution rates of the agglomerates may be materially reduced by inclusion in the formulation of low-solubility components, as for instance, certain of the binders discussed, the other additives, or by hydrophobic materials of the type of a silicone, hydrocarbon oils, or metallic stearates.

It has been further found that certain polyvalent metallic cations, as for example, those of aluminum, zinc, tin, iron, chromium, magnesium and silicon, act in the agglomerating process as cementitious agents, in that they materially increase the hardness and impact strength of the finished product. Such agents are usually compounded with the N-halogenated compound as an acid salt, an alkaline or alkaline earth salt of the hydrated oxide, or as a neutral hydroxide at some stages in the manufacturing operation where water is present. Amounts commonly incorporated represent .5% to 5% of the N-halogenated compound used. The form which these metallic cations assume in the agglomerate is not known, but certain of these salts are made available in the water as hydrated oxides in the dissolution process, wherein they may serve additional functions in the full treatment of water, as will appear.

The other water-treating additives having application herein are constantly dissolved or released to the water as the surface of the agglomerate dissolves or erodes. Such additives are buffering compounds such as phosphates, coagulants for colloidally suspended matter, filter assists such as diatomaceous earth, algicides, surfactants, ion exchange resins, and the like. One or more such additives may be added to the agglomerate, dependent on the type of impurities it is intended to remove from the water being treated.

Agglomerates useful in this invention may be compounded and formed in accordance with the following examples:

Example 1

| | Lbs. |
|---|---|
| N-bromo-N$^1$-chlorodimethylhydantoin | 100 |
| Methyl methacrylate copolymer emulsion (42% in water) | 2 |
| Sodium silicate (50% in water) | 1 |

The N-bromo-N$^1$-chlorodimethylhydantoin was placed as a dry powder in a pony mixer. To this was added sufficient water to make a paste, and the methacrylate emulsion and the sodium silicate solution were mixed in for an additional two minutes. The wet mass was then transferred to egg-shaped molds and dried in an oven at 150° F. overnight. The dried agglomerates were released from the molds. Several were immersed in water and found to have excellent shape retention, showing no indication of crumbling even after a three-month soaking period. Each agglomerate weighed 21 grams and had an average surface area, as determined by actual measurement, of 3.87 square inches. Several of the agglomerates were immersed separately in 1000 ml. of slowly-stirred distilled water for one minute at 20° C. By analyzing such water for total halogen uptake, a value for their dissolution rate per unit of surface area was obtained. Such value, expressed in terms of the active halogen released, was found to be 1.87 mgm. of active halogen per minute per square inch of surface area. By comparison, 21 grams of the powdered N-bromo-N-chlorodimethylhydantoin, stirred slowly in 1000 ml. of the water, produced a saturated solution within the minute interval which contained 610 mgm. per liter of active halogen.

Example 2

| | Lbs. |
|---|---|
| N,N$^1$-dibromodimethylhydantoin | 286 |
| N,N$^1$-dichlorodimethylhydantoin | 200 |
| Aluminum hydroxide gel | 8 |

The above ingredients were dry-mixed, water was then added to form a paste, and the mass was extruded through a suitably-sized die and cut into rods one inch in diameter and 3 inches long, each weighing one-tenth pound. The rods were dried in warm air. When immersed in distilled water, they retain their shape, and, upon test, were found to have a dissolution rate to impart 14 mgm. of active halogen per one-tenth pound per minute. In this formulation the N,N$^1$-dibromodimethylhydantoin and the N,N$^1$-dichlorodimethylhydantoin react to form N-bromo-N$^1$-chlorodimethylhydantoin which is the effective disinfecting agent. The aluminum hydroxide serves as a cementitious agent in the agglomeration process and upon its release to water acts as a coagulant.

Example 3

A hard cake of bromo-chloro-triethylene diamine dihydrochloride as taken from a centrifuge was broken into lumps and dried. The dried lumps were shattered into fragments in a mill and screened to provide a cross-sectional length of not less than ⅜″. When subjected to the action of the water in a device suitable for the intermittent treatment of a potentially contaminated domestic water supply, the agglomerates imparted a free halogen residual of between 4 and 6 mgm. per liter, maximum concentrations being limited at all times by the 8 mgm. per liter solubility of the compound.

Example 4

| | Lbs. |
|---|---|
| N,N$^1$-dichloro-N$^{11}$-bromo-melamine | 100 |
| Finely ground base exchange zeolite | 625 |

The N-halogenated melamine was thoroughly mixed into the powdered zeolite, wetted to form a paste and extruded into a cylinder 3″ in diameter and 6″ long. Two such blocks were inserted in a treating tank made part of the permanent plumbing of a domestic water system.

The ratio of the N-halogenated organic compound and the ion exchange material may be varied widely, dependent on the contamination load and the calcium and magnesium hardness requiring removal. The dissolution rate of such agglomerate is controlled in a large measure by the demand of the water for halogen, whereby the surface structure of the agglomerate is broken down, facilitating an erosion process to release the zeolite.

As is evident, the agglomerates of the present process have wide application. All contain an N-halogenated organic compound, which compound serves the functions of disinfection, iron and sulfide removal and the like, and all-important function of regulating the dissolution rate of the agglomerate in response to the halogen demand of the water. Impurities reacting to remove the active halogen from the exposed surface of the agglomerate may radically increase dissolution rates to impart to the water both active halogen and such other additives as the agglomerate may contain. In those waters where there is little contamination load and therefore little demand on the agglomerate to provide halogen, dissolution rates as determined in distilled water closely parallel those in the field. My agglomerates may or may not contain a binder, but where a binder is used it is preferably present in a quantity representing 1 to 5% of the N-halogenated compound with which it is mixed. Where a metallic salt is added, percentages representing 0.5 to 5% of the agglomerate are common. Filter assists, particularly in the form of diatomaceous earth, are commonly incorporated into the agglomerate formulation when the halogen treatment is followed by filtration. Amounts ranging from 2 to 50% have been successfully used. The following is a typical general formula for the agglomerates:

|  | Parts |
|---|---|
| N-halogenated organic compound | 100 |
| Binder (optional) | 1–5 |
| Metallic salt (optional) | 0.5–5 |
| Filter assists (optional) | 2–50 |
| Ground ion exchange material (optional) | 5–90 |
| Other additives (optional) | q.s. |

In order to demonstrate the influence of the demand factor on the dissolution rate of the agglomerates to provide active halogen, several compounds were exposed, in agglomerate form, to water in a burette. The water used contained typical impurities as might occur in water requiring treatment. The compounds selected were shaped into rods 7 milliliters in diameter and 25 millimeters long. Five such rods for each compound were placed in a burette through which was passed various water samples at the rates as shown in Table II. The values of active and total halogen are obtained by methods known in the art and are expressed in milligrams of halogen per liter.

The response of the agglomerates in each instance to the contamination demand placed on the N-halogenated compound to provide additional halogen is marked. Water from different sources will contain different impurities and place widely varying demand on the agglomerates. This chart shows how the response varies with such different impurities, and how an N-halogenated compound best suited for any specific water treatment can be selected.

The N-halogenated organic rompounds in solid agglomerate form have a wide application in a variety of water purification needs. They have found particular application in the disinfection of swimming pool water and sewage effluent, which exhibit notoriously variable halogen demand, and for the disinfection and full treatment of domestic and industrial waters to remove iron, sulfides, and hardness as well.

In the treatment of swimming pool water, the maintenance of a halogen residual to adequately disinfect the water and removal of the contaminating protein from the water are of prime importance. Aluminum and iron hydrated oxides react with and precipitate protein. Such protein may be colloidal in size, as is the case with contaminating bacteria and algae, or may exist in such fine dispersion that it would normally be considered water soluble. Because of this property, the use of N-halogenating agglomerates containing iron hydroxide or aluminum hydroxide, or salts thereof, serve the additional function of precipitating the objectionable protein contamination, and promote its complete removal on the pool filter.

In many areas of water treatment where filtration is a part of the cycle, it is common pratcice to continuously add filter assists. I have found it advantageous in many such cases to add diatomite to my agglomerates, which material will slough off as the agglomerates dissolve, to greatly prolong the time before backwashing is necessary. When iron or aluminum cations have been incorporated in the agglomerate, the addition of the diatomite is of particular importance to prevent plugging of a filter with their gelatinous precipitates.

The inclusion of an ion exchange material is useful in domestic and certain industrial water treatment where calcium and magnesium hardness may cause difficulty. Cation exchangers, both inorganic and organic, are preferably incorporated as finely ground powders. These materials will become functional to remove hardness as the agglomerates dissolve. Anion exchangers could be similarly used. Such exchanger may be filtered from the treated water stream and regenerated for inclusion in other agglomerates or may be discarded.

For a more complete understanding of a process employing the above-described agglomerates for purposes of treating a water supply, reference should be made to the drawing wherein:

FIG. 1 is a fragmentary elevational view, partly broken away, of apparatus employed in conjunction with halogen-releasing agglomerates for treating the recycled water of a swimming pool; and FIG. 2 is a perspective view of apparatus which may

| Contaminant [1] | Through-put Time, 34 ml. sample | Total Halogen Released | | Percent Increase in Dissolution Rate [2] |
|---|---|---|---|---|
| | | In Distilled water, mgm./liter | In Contaminated water, mgm./liter | |
| N-bromo-N-chlorodimethyl-hydantoin | 165 sec | 36 | | |
| NH₃ | 165 sec | | 57 | 58 |
| Urea | 165 sec | | 47 | 21 |
| Urine | 167 sec | | 42 | 17 |
| N,N-dibromodimethylhydantoin | 213 sec | 25 | | |
| NH₃ | 214 sec | | 68 | 172 |
| Urea | 219 sec | | 32 | 24 |
| Urine | 216 sec | | 34 | 36 |

[1] NH₃, 100 mgm. per liter; Urea, 100 mgm. per liter; Hydrogen sulfide, 50 mgm. per liter Urine, 4 ml. diluted to 1 liter; Sewage effluent, as collected.
[2] Percent increase in total halogen release in presence of contaminant over that found in distilled water.

be employed for attaching to a sink faucet for purposes of treating the water passing therefrom, as will hereinafter be discussed in greater detail.

Referring now to FIG. 1, a tank 10 is illustrated which comprises a container for solid agglomerates of an N- halogenated compound. Tank 10 is filled with the agglomerates such as those described, by removal of the lid 11. Clamps 13 retain the lid secured to the upper edge of the tank in fluid-tight engagement. Water from the pool (not shown) which is to be treated enters tank 10 by means of an inlet line 12. Line 12 functions to by-pass some of the water through such tank before it enters a filter 15 from which water passes to a pool by line 27. That water not entering by-pass 12 proceeds toward filter 15 by means of line sections 17, 19 and 28. It is to be noted that the tank inlet line 12 is reduced in size when compared to the main pumping line 14 in communication with pump 20, since in conjunction with swimming pools it has been found preferable to pass only a portion of the recycling water over the agglomerates in the treating tank.

Line 16 serves to connect the bottom outlet of the tank with the main pumping line portion 28 which enters the bottom of filter 15 and is provided with a suction device at the T 18 to assure that water will be continuously drawn through the tank 10 as long as water is being pumped through the main line and valves 22 and 26 are open. Valve 22, disposed adjacent to tank inlet 24, serves to regulate the amount of water entering tank 10. Valve 22, used in conjunction with valve 26, will also serve to completely shut off the tank when necessary, as when reversing the flow of water through filter 15 by means of line 29 for backwashing purposes.

It should be noted that tank 10 consists of two sections, 10d and 10s. Section 10d, which is disposed below the water inlet 24 and through which the water is continuously passed, serves as the active dissolving area for the halogenating agglomerates. Tank section 10s acts as an agglomerate reservoir. The amounts of chlorine or bromine required to maintain adequate disinfecting levels in various size swimming pools during normal usage is known. Using these predetermined values, the size of tank section 10d may be roughly calculated to provide an appropriate surface area for agglomerates of a known dissolution rate. However, tank section 10d is also subject in its design to other variables, several of which are discussed below.

It is to be further noted that the level of the agglomerates in tank 10 is always to be kept above inlet 24, so that for tanks of the same dimensions and agglomerates of the same size and shape, a predetermined and desired surface area of an N-halogenated compound may always be exposed to the action of the flowing water. As such water passes through tank 10, entering at inlet 24 and emerging at outlet 16, it will slowly dissolve agglomerates and displace downward other agglomerates from storage area 10s provided for these in the tank above the water inlet 24. Reduction in the size and alterations in shape lead to packing of the agglomerates in lower dissolving area 10d of the tank. However, continuous replacement of agglomerates from the reserve portion of the tank disposed above water inlet 24 soon results in a state of surface area equilibrium, and it has been found that this type of treatment system may operate for long periods of time without any appreciable variation in this factor. Such factors as extremely heavy bather load, high pool-water temperatures, and water exposure to sunlight, tend to increase the halogen demand of the pool, and these, too, must be taken into account in calculating the dimensions of tank section 10d.

Swimming pools are constructed in a variety of sizes. To obviate the necessity of designing many tank sizes to provide for a correct exposed surface area of agglomerates, an adjustable perforated plate bottom may be employed to support the agglomerate bed. This bottom may take the form of an adjustable stand 60 illustrated in FIG. 1. Such stand comprises a perforated plate 62 which is disposed across substantially the entire cross-section of tank 10. The perforations of plate 62 may be covered with a screen if desired. Supporting adjustable telescopic legs 64 depend from peripheral portions of the plate 62 and serve to position the plate 62 at a desired distance from the tank bottom, thereby fixing the tank volume above the plate for containing the solid agglomerates. The initial positioning of the perforated plate may be done by calculation. If the halogen input into the water stream is found to be too high, the plate may be raised to decrease the surface area of agglomerates in section 10d of tank 10 or conversely, it may be lowered to increase the halogen input. It can be seen that such type of bottom adjustment will greatly facilitate the fine control of an operating system.

To begin the addition of halogen to the pool water, it is merely necessary to open valves 22 and 26 so that water flows through tank 10. The amount of active halogen made available to the water is not only dependent on the predetermined dissolution rate of the agglomerates being used, but on the varying demand of the pool water for halogen, as well. The quantity of water recycled through an agglomerate bed is of graded importance, so long as it is sufficiently large to allow solution of the N-halogenated compound as fast as it is being evolved, but not so great as to distintegrate the agglomerate being used. With swimming pools it is preferred to by-pass through the treating tank an amount of water representing about 2 to 60% of the total water pumped in the filtering circut. When it is necessary to increase dissolution rates to compensate for unusually heavy bather or sun load, water velocities are maintained somewhat higher through tank 10 by opening valves 22 and 26. The agglomerates still respond to the pool water demand, but a higher dissolution rate factor has been impressed on them by surface erosion to continuously make available more halogen. It is of further note that under these circumstances a greater proportion of the contamination load in the recycled water has actual contact with the N-halogenated compound to maximize autonomic response. Higher water velocities through the agglomerate bed have special significance when the water being treated contains extraneous matter such as iron or protein which tend to precipitate out on the agglomerate surface and should be continuously flushed away.

When it is necessary to raise halogen levels very rapidly in the pool water, the valves in the by-pass line are fully opened. Velocity adjustments of the type required are carried out very effectively by large-orifice valves of the gate or globe variety since substantial adjustments in the water flow are involved. Needle valves or closely calibrated metering equipment is not required.

By specific reference to the operation of a 23,000-gallon indoor swimming pool, the size of the treating tank used and the piping involved will indicate the actual operational details of an installed system. The system hereafter discussed was similar to that illustrated in FIG. 1. The recycling and filtering system for this pool consisted of a pump, a treating tank for holding the agglomerates which was placed on a by-pass before the filter, and a filter. The main pumping line was of 2-inch pipe, and the by-pass line of 1-inch pipe. The agglomerate tank 10, constructed of galvanized steel, was 6 inches in diameter and 3 feet high. The tank inlet was disposed 16 inches from the top of the tank. This tank was loaded with sticks of Example 2, measuring 1 inch in diameter and 3 inches in length, and consisting essentially of N-bromo-N-chloro-dimethylhydantoin. It was found that, when randomly placed, 7 pounds (70 sticks) were required to fill the tank to the level of the water inlet. A reserve of 6 additional pounds of sticks was disposed above the inlet to serve as the agglomerate reservoir. The tank inlet valve was opened and adjusted to permit a flow rate of water through the tank of about 5 gallons per minute. At this point the flow meter on the main line showed a total pumping rate of 90 gallons per minute.

The temperature of the pool water was 80° F. Halogen residuals in the water were determined by a chlorine test kit using o-tolidine. It was found that active halogen values as read at the pool inlets averaged 3 parts per million, while the pool in general showed a daily average of 0.6 to 0.8 part per million. During and after peak pool loading halogen residuals never fell below .4 part per million. Concentrations of .4 part per million active halogen as read on the chlorine test kit were found by actual bacterial plate counts on water samples taken from the pool to represent E. coli-free water. Concentrations of halogens up to 1.2 parts per million were non-irritating to swimmers.

Still another application for my agglomerates is in the treatment of potentially contaminated domestic water supplies. In FIG. 2, a treating device 30 is illustrated which is adapted to be secured to, for instance, the dividing partition between two sink compartments. The device 30 has a base portion 32 which may be cut out as at 34 for purposes of being more securely fixed to the dividing portion of the sink. Mounted on base portion 32 of device 30 is a cylinder 36, preferably of glass or transparent plastic, which functions as a container for solid agglomerates of an N-halogenated organic compound, such as those described in Example 5.

The base portion of device 30 within the periphery of the cylindrical container 36 is apertured as at 38, whereby a nipple 40 may depend from such aperture and communicate with one end of a rubber hose 42, which is connected at an opposite end limit to a faucet member 44 fragmentarily illustrated in FIG. 2. Since in many sink installations a single faucet is provided, rubber hose should be supplied with a quick-acting device to facilitate on-and-off connection to the faucet member 44 when treated water is not required. Also disposed within cylinder 36 is an open-end tube member 46 which communicates with a discharge nozzle 48 of the device 30 by means of a connecting conduit portion 50 disposed beneath the upper surface of the base portion 32 of the illustrated device 30.

In order to prevent passage of small particles of the solid agglomerates disposed within the container 36 into the open end of tube 46 and from the discharge nozzle 48, tube 46 is surrounded by fine mesh screen 51 which is preferably formed of a plastic. New solid agglomerates may be inserted into the cylinder 36 by removing cap portion 52, which is secured to the upper periphery of the cylinder by means of clamp 54 or other equivalent means. In the normal course of operation of the illustrated device 30, water from faucet 44 passes through hose 42 into nipple 40 so as to enter cylinder 36. In the course of the water passing through the cylinder, the agglomerates containing the desired halogen are dissolved at a rate determined largely by the halogen demand of the water, and the solution containing the active halogen passes through the screen 51 into the tube 46 and out the discharge nozzle 48. N-halogenated compounds preferably used in this application would be at the lower end of the solubility scale, having degrees of solubility to release not more than about 5 parts per million of active halogen. Because of the quick-kill requirements, organic compounds releasing all bromine or bromine with chlorine would be the materials of choice.

Many domestic and industrial water supplies contain inorganic impurities of the type of iron and sulfides which it is desirable to remove. Iron is continuously precipitated as the insoluble ferric hydroxide in the presence of the active halogen, and may be removed as such by filtration. Sulfides are readily oxidized to the non-odorous form during passage of the water through the agglomerate bed. A treating device of the type illustrated in FIG. 1 or FIG. 2, modified for in-line connection, may be advantageously inserted in a water pipe, followed by a filter capable of periodic backwashing to remove the precipitated iron.

As has become apparent in the preceding description of the process, the application of low solubility N-halogenated organic compounds in agglomerate form to the treatment of water supplies provides a simple and self-regulatory system. An important feature of the present invention is the requirement that the water to be treated flow over or otherwise directly contact the agglomerated N-halogenated organic compound. The amount of halogen imparted to the water is then not only dependent on the dissolution rate of the agglomerate selected but also by the demand placed on such agglomerate by the impurities contained in the water. In many instances where the contamination load is heavy, the demand placed on such agglomerates for halogen becomes the dominant factor, the solubility of the N-halogenated compound being used and the dissolution rate of the agglomerate as determined under low demand having little bearing on the actual rate of halogen release to the water.

A common requirement of the N-halogenated organic compounds finding application in the invention is that they are solids and have stability in agglomerate form to provide active halogen over prolonged periods of exposure to water. They must contain at least one N-halogen radical which is bromine and, in addition, optionally chlorine.

It can be readily realized that the enclosure containing the agglomerates may take many shapes and sizes. It may have water passing down and through it, or up from the bottom, depending upon various type applications. It may be placed before or after the filter or may be provided as an integral part of such filter. Where it is not desired to install a separate treating tank, the agglomerates may be advantageously placed directly in the filtering tank or skimmer lint strainer and the number renewed at regular periods to provide a substantially constant exposed surface area.

In a preferred system of treating water, particularly where the halogen demand may be heavy and fluctuating, the actively dissolving agglomerate bed exposed to the water being treated has superimposed a bed of reserve agglomerates which constantly feed down by gravity. In this manner, the amount of active halogen imparted to the water under normal demand becomes a known and controllable factor. Any deviations from normal demand result in increased or decreased dissolution rates to provide a constant halogen residual.

When such agents are used in the treatment of potable water, the toxicity of the carrier becomes a factor, and in the selection of a suitable N-halogenated compound this must be taken into consideration.

In view of the many modifications which may be made in the inventive concepts above described, it is intended that this invention be limited only by the scope of the appended claims.

I claim:

1. An autonomic method of treating impure water, comprising passing the water in flowing contact with water-stable agglomerates of an N-halogenated organic compound having a low solubility in water of from 0.0001 to 1% by weight at 20° C., the labile N-halogens being selected from the group consisting of bromine and chlorine and at least one halogen being bromine, and imparting to the water at saturation at least 1 mg. per liter of active halogen, said agglomerates having good shape retention in water, to dissolve substantially only from their exposed surfaces, and at a dissolution rate in distilled water to provide thereto a quantity of active halogen in the range of about 1 to about 3,000 mg. per minute per pound of agglomerated material exposed to the water, the exposed surfaces of said agglomerates reacting automatically to provide halogen to the impure water in contact therewith, and maintaining a surface area exposure of agglomerates in continuous contact with the water being treated, the surface area exposure being sufficiently large to provide a predetermined active halogen residual to water flowed thereover.

2. A method in accordance with claim 1 wherein the surface area of agglomerates exposed to the impure water is maintained substantially constant by continuous replenishment automatically from a reserve supply of said agglomerates.

3. A method in accordance with claim 1 wherein the impure water contains protein contamination, and the agglomerates contain a hydrous oxide-forming additive continuously released to the water in contact therewith to precipitate said protein.

4. A method in accordance with claim 1 wherein the impure water is contaminated swimming pool water, recycled for purification in contact with said agglomerates, said agglomerates having a surface area sufficient to maintain at least 0.3 mg. of active halogen residual per liter of the pool water.

5. A method in accordance with claim 1 wherein the impure water is swimming pool water of which a portion is recycled for purification in contact with the agglomerates, and the surface area of the agglomerates is maintained substantially constant by continuous replenishment from a reserve supply of agglomerates, the constant surface area being sufficient to maintain at least 0.3 mg. of active halogen per liter of pool water.

6. A method in accordance with claim 1 wherein the water is filtered after treatment with the agglomerates and the agglomerates contain a filter assist continuously supplied to the water by release from the agglomerates by the dissolution of the N-halogenated organic compound.

7. A method in accordance with claim 1 wherein the impure water contains calcium and magnesium hardness, and the agglomerates contain ion exchange materials to remove such calcium and magnesium hardness, supplied to the water in contact therewith by release from the agglomerates by the dissolution of the N-halogenated organic compound.

8. A method in accordance with claim 1 wherein the water is filtered after treatment with the agglomerates and the agglomerates contain a compound of a polyvalent metal selected from the group consisting of aluminum and iron to precipitate impurities; and diatomaceous earth to aid in the filtering out of the precipitated impurities, such additives being supplied to the water in contact therewith by release from the agglomerates by the dissolution of the N-halogenated organic compound.

9. A method in accordance with claim 1 wherein the water after treatment with the agglomerates is filtered, and the agglomerates contain an additive selected from the group consisting of a hydrous oxide-forming polyvalent metal compound, ion exchange materials; and filter assists, such additives being supplied to the water by release from the agglomerates by the dissolution of the N-halogenated organic compound.

10. A method in accordance with claim 1, wherein the water contains iron, and is filtered after treatment with the agglomerates.

11. A method in accordance with claim 1, wherein the water contains sulfides.

12. A water-treating solid agglomerate having good shape retention in water comprising an N-halogenated organic compound, the halogen being selected from the group consisting of chlorine and bromine, and at least one halogen being bromine, bonded in an agglomerate form by an amount of a compound of a polyvalent metal selected from the group consisting of aluminum, tin, zinc, iron, chromium, magnesium and silicon, sufficient to increase the hardness and impact strength of the agglomerate.

13. A water-treating solid agglomerate in accordance with claim 12, in which the amount of the polyvalent metal compound is up to about 5% by weight of the agglomerate.

14. A water-treating solid agglomerate in accordance with claim 12, comprising in addition up to 5% of a binder.

15. A water-treating solid agglomerate in accordance with claim 12, comprising from about 2 to about 50% of a filter assist.

16. A water-treating solid agglomerate in accordance with claim 15, in which the filter assist is diatomaceous earth, and the polyvalent metal is selected from the group consisting of aluminum and iron.

17. A water-treating solid agglomerate comprising an N-halogenated organic compound, the halogen being selected from the group consisting of chlorine and bromine, and at least one halogen being bromine, to provide a controlled halogen release during dissolution thereof in water, and an additive selected from the group consisting of hydrous oxide-forming compounds of a polyvalent metal from the group consisting of aluminum, tin, zinc, iron, chromium, magnesium and silicon; filter assists; and ion exchange materials, to provide controlled release of such additives as the N-halogenated organic compound is dissolved, the N-halogenated organic compound having a low solubility in water of about 0.0001 to 1% by weight at 20° C., and imparting to the water at saturation at least 1 mg./l. of active halogen, said agglomerate having good shape retention in water, to dissolve substantially only from its exposed surface, and at a dissolution rate in distilled water to provide thereto a quantity of active halogen in the range from about 1 to about 3,000 mg. per minute per pound of agglomerated material exposed to the water, the exposed surfaces of the agglomerate reacting autonomically to provide to water flowing in contact therewith a predetermined active halogen residual.

18. A water-permeable bed of agglomerates in accordance with claim 17, fabricated in the form of rods.

19. A water-treating solid agglomerate in accordance with claim 17 comprising a binder compound of a polyvalent metal selected from the group consisting of aluminum, tin, zinc, iron, chromium and magnesium and silicon, sufficient to increase the hardness and impact strength of the agglomerate.

20. A water-treating solid agglomerate in accordance with claim 19 in which the polyvalent metal compound is in an amount up to 5% by weight of the composition.

References Cited

UNITED STATES PATENTS

| | | | |
|---|---|---|---|
| 1,457,503 | 6/1923 | Cross | 210—62 X |
| 1,958,370 | 5/1934 | Schmelkes | 210—62 X |
| 2,578,270 | 12/1951 | Strain | 252—187 |
| 2,721,861 | 10/1955 | Paterson | 260—113 |
| 2,820,701 | 1/1958 | Leslie | 210—169 X |
| 2,874,845 | 2/1959 | Fain et al. | |
| 2,920,997 | 1/1960 | Wolf et al. | 167—33 |
| 3,061,549 | 10/1962 | Dickey | 8—108 X |
| 3,040,044 | 6/1962 | Hirsch et al | 252—102 X |
| 3,165,521 | 1/1965 | Slezak et al. | 210—62 X |
| 2,607,738 | 8/1952 | Hardy | 260—248 X |

FOREIGN PATENTS

| | | |
|---|---|---|
| 483,661 | 4/1938 | Great Britain. |
| 728,818 | 4/1955 | Great Britain. |

OTHER REFERENCES

Betz Handbook of Industrial Water Conditioning, Betz Laboratories, Phil., Pa. 1957 Fifth Edition, pp. 30–32 relied on.

Kressman, T. R. E., History and Some Applications of Ion Exchange, Ion Exchange Research, May 1952, pp. 212–219, page 212 particularly relied on.

McCulloch, E. C., Phenothiazine-Medicated Pellets etc., Jour. A.V.M.A., August 1942, pp. 114–119, page 117 particularly relied on.

MICHAEL E. ROGERS, *Primary Examiner.*

UNITED STATES PATENT OFFICE
CERTIFICATE OF CORRECTION

Patent No. 3,412,021 November 19, 196

Laurene O. Paterson

It is certified that error appears in the above identified patent and that said Letters Patent are hereby corrected as shown below:

Columns 3 and 4, TABLE I, the first column should appear as shown below:

N-halogenated
Organic Compound

Phthalimide
   N-chloro-
   N-bromop-toluene sulfonamide
   N-dichloro-
   N-bromo-N-chloro- Azodicarbonamidine hydrochloride
   $2,5-N,N^1$-dichloro- Dimethylhydantoin
   $N,N^1$-dichloro-
   $N$-bromo-$N^1$-chloro-
   $N,N^1$-dibromo- Diphenylhydantoin
   N-bromo-N-chloro- Dimethylglycoluril
   N,N,N,N-tetrachloro-
   N-bromo-N,N-dichloro-
   $N,N^1$-dibromo- Glycoluril
   N,N,N,N-tetrachloro-
   N,N-dichloro- Sodium cyanurate
   N-bromo-N-chloro- Triethylene diamine
   Dibromo-dihydrochloride
   Bromo-chloro-dihydrochloride Melamine
   N,N,N-trichloro- 3,412,021

(2)

Column 7, after line 53, insert -- TABLE II --. Column 8, line 4, "rompounds" should read -- compounds --. Column 14, line 14, after "metal" insert -- selected --.

Signed and sealed this 24th day of March 1970.

(SEAL)
Attest:

EDWARD M. FLETCHER, JR.
Attesting Officer

WILLIAM E. SCHUYLER, J
Commissioner of Patent